United States Patent
Manipatruni et al.

(10) Patent No.: US 10,170,185 B2
(45) Date of Patent: Jan. 1, 2019

(54) HYBRID MEMORY AND MTJ BASED MRAM BIT-CELL AND ARRAY

(71) Applicant: Intel Corporation, Santa Clara, CA (US)

(72) Inventors: Sasikanth Manipatruni, Hillsboro, OR (US); Ian A. Young, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/036,761

(22) PCT Filed: Dec. 24, 2013

(86) PCT No.: PCT/US2013/077668
§ 371 (c)(1),
(2) Date: May 13, 2016

(87) PCT Pub. No.: WO2015/099703
PCT Pub. Date: Jul. 2, 2015

(65) Prior Publication Data
US 2016/0300612 A1    Oct. 13, 2016

(51) Int. Cl.
*G11C 14/00*    (2006.01)
*B82Y 10/00*    (2011.01)
(Continued)

(52) U.S. Cl.
CPC .......... *G11C 14/0036* (2013.01); *B82Y 10/00* (2013.01); *G11C 11/161* (2013.01);
(Continued)

(58) Field of Classification Search
CPC ............ G11C 14/0036; G11C 13/0011; G11C 11/1673; G11C 13/0004; G11C 14/0045;
(Continued)

(56) References Cited

U.S. PATENT DOCUMENTS 7,079,148 B2    7/2006    Sharma et al.
7,098,493 B2    8/2006    Van Der Zaag et al.
(Continued)

FOREIGN PATENT DOCUMENTS

CN    1577312        2/2005
CN    101231883 A    7/2008

OTHER PUBLICATIONS

Seok-Jun Won et al., "Conformal CVD-ruthenium process for MIM capacitor in giga-bit DRAMs," Electron Devices Meeting, 2000. IEDM '00. Technical Digest. International, San Francisco, CA, USA, 2000, pp. 789-792.*
(Continued)

*Primary Examiner* — Ajay Ojha
(74) *Attorney, Agent, or Firm* — Schwabe, Williamson & Wyatt P.C.

(57) ABSTRACT

Described is an apparatus for a hybrid eDRAM and MRAM memory cell comprising: a capacitor having a first terminal and a second terminal; a first transistor having a gate terminal coupled to a first word line (WL), a source/drain terminal coupled to bit line (BL), and drain/source terminal coupled to the first terminal of the capacitor; a resistive memory element having a first terminal and a second terminal, the first terminal of the resistive memory element device coupled to the first terminal of the capacitor; and a second transistor having a gate terminal coupled to a second WL, a source/drain terminal coupled to source line (SL), and drain/source terminal coupled to the second terminal of the resistive memory element device.

19 Claims, 7 Drawing Sheets

(51) Int. Cl.
*G11C 11/16* (2006.01)
*G11C 13/00* (2006.01)
*H01L 27/108* (2006.01)
*H01L 27/22* (2006.01)
*H01L 43/08* (2006.01)
*H01L 43/10* (2006.01)
*H01L 43/12* (2006.01)
*H04L 9/08* (2006.01)

(52) U.S. Cl.
CPC ...... *G11C 11/1657* (2013.01); *G11C 11/1659* (2013.01); *G11C 11/1673* (2013.01); *G11C 11/1675* (2013.01); *G11C 13/0004* (2013.01); *G11C 13/0011* (2013.01); *G11C 13/0069* (2013.01); *G11C 14/0045* (2013.01); *H01L 27/1087* (2013.01); *H01L 27/10832* (2013.01); *H01L 27/228* (2013.01); *H01L 43/08* (2013.01); *H01L 43/10* (2013.01); *H01L 43/12* (2013.01); *G11C 14/0018* (2013.01); *H04L 9/0897* (2013.01)

(58) Field of Classification Search
CPC .............. G11C 11/1675; G11C 11/161; G11C 13/0069; H01L 27/10832; H01L 27/1087; H01L 43/10; H01L 27/228; H01L 43/12; H01L 43/08
See application file for complete search history.

(56) References Cited

U.S. PATENT DOCUMENTS

| | | | | |
|---|---|---|---|---|
| 8,228,731 | B2 * | 7/2012 | Rao | G11C 14/0018 365/149 |
| 2002/0015322 | A1 | 2/2002 | Cloud et al. | |
| 2003/0231528 | A1 | 12/2003 | Choi et al. | |
| 2004/0202022 | A1 | 10/2004 | Sharma et al. | |
| 2006/0120138 | A1 * | 6/2006 | Liaw | B82Y 10/00 365/149 |
| 2008/0175037 | A1 | 7/2008 | Cheng et al. | |
| 2009/0100307 | A1 | 4/2009 | Lee | |
| 2012/0026794 | A1 | 2/2012 | Lueng | |
| 2012/0327714 | A1 | 12/2012 | Lue | |
| 2015/0006881 | A1 * | 1/2015 | Perlmutter | H04L 9/0897 713/155 |

OTHER PUBLICATIONS

Notification of Transmittal of the International Preliminary Report on Patentability of the International Searching Authority for PCT/US2013/077668 filed Dec. 24, 2013 dated Jul. 7, 2016, 11 pages.
Office Action including Search Report from the Taiwan Intellectual Property Office dated May 20, 2016 for Taiwan Patent Application No. 103140658 and English Translation thereof.
Office Action including Search Report from the Taiwan Intellectual Property Office dated Jan. 25, 2016 for Taiwan Patent Application No. 103140658 and English Translation thereof.
Notification of Transmittal of the International Search Report and the Written Opinion of the International Searching Authority for PCT/US2013/077668 filed Dec. 24, 2013 dated Sep. 25, 2014, 14 pages.
First Office Action (11 pages) dated Mar. 22, 2017 by the Chinese Patent Office for Chinese Patent Application No. 201410811852.9.
Search Report from European Patent Application No. 13900209.1 dated Oct. 10, 2017, 12 pgs.
Keiko Abe et al., "Novel hybrid DRAM/MRAM design for reducing power of high performance mobile CPU" 2012 International Electron Devices Meeting (IEDM 2012): San Francisco, CA US IEEE Dec. 10, 2012, p. 10-13.
Hiroki Noguchi et al., "D-Mram cache: Enhancing energy efficiency with 3T-IMTJ DRAM/MRAM hybrid memory," Design, Automation & Test in Europe Conference & Exhibition, Mar. 18, 2013, pp. 1813-1818.
Second Office Action for Chinese Patent Application No. 201410811852.9 dated Dec. 5, 2017, 13 pgs., no translation.

* cited by examiner

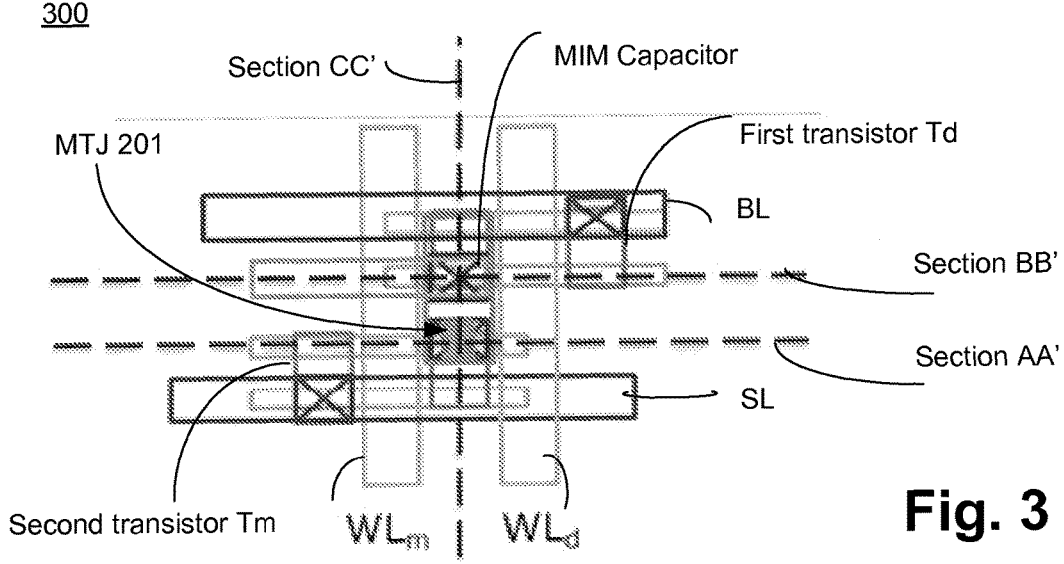
Fig. 3
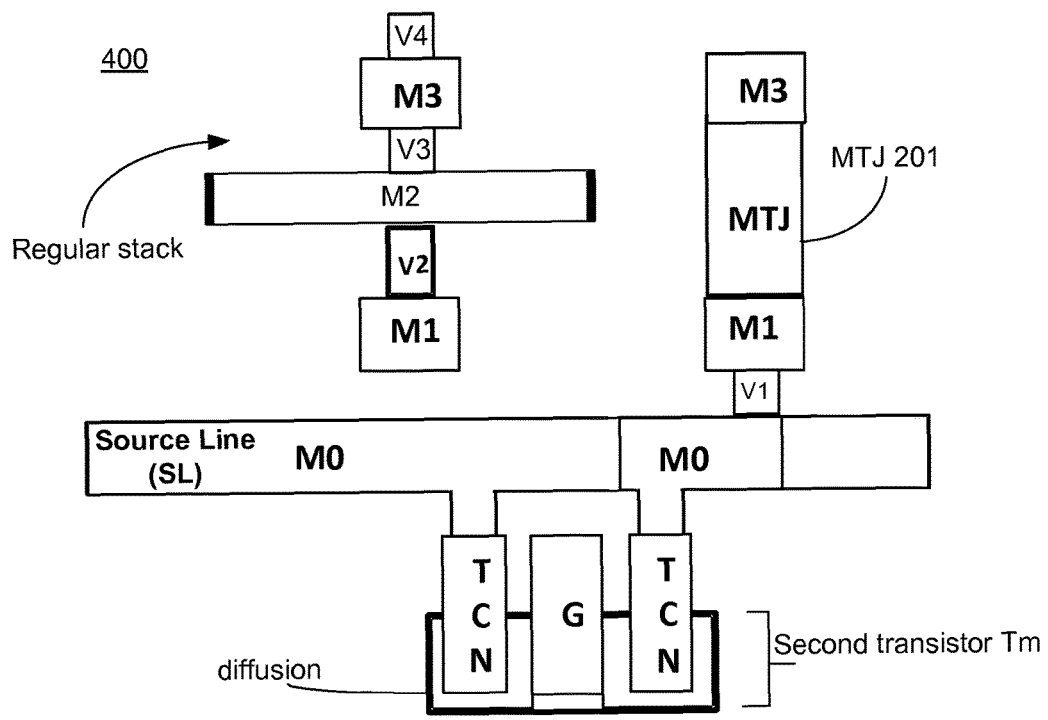
Section AA'  Fig. 4A

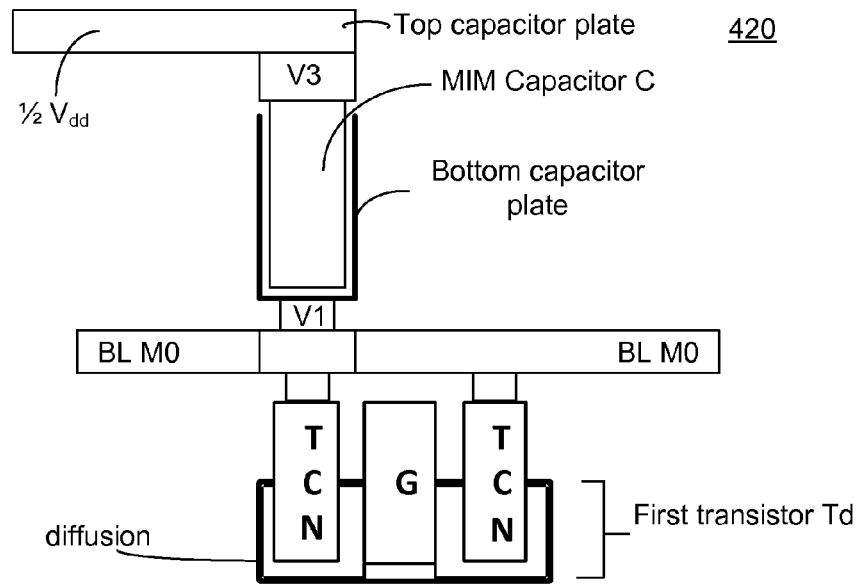
Section BB'  Fig. 4B
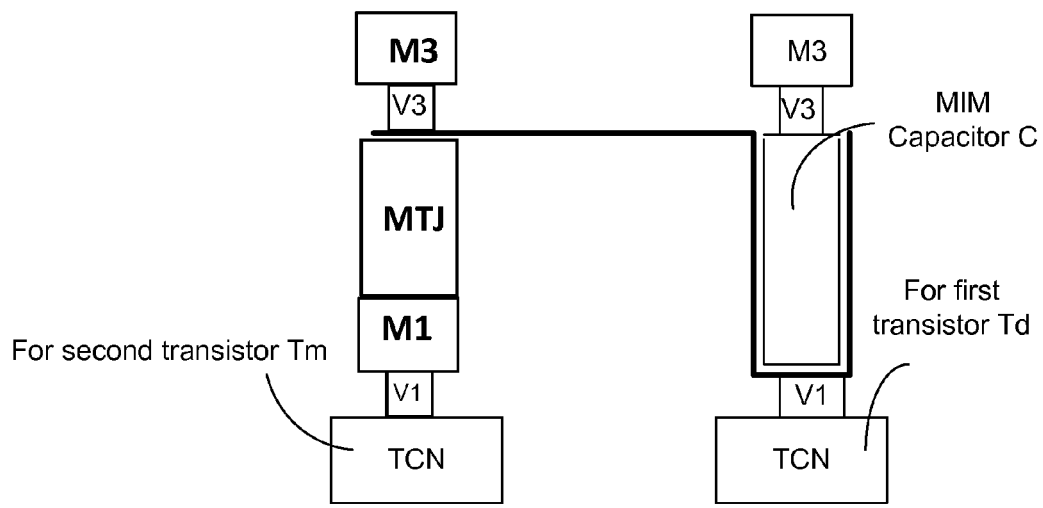
Section CC'  Fig. 4C

ID-CELL AND ARRAY

This patent application is a U.S. National Phase Application under 35 U.S.C. 371 if International Application No. PCT/US2013/077668 filed Dec. 24, 2013.

BACKGROUND

On chip embedded memory with non-volatility can enable energy and computational efficiency. However, leading embedded memory options such as STT-MRAM (Spin-Transfer Torque Magnetic Random Access Memory) suffer from high voltage and high current-density problems during the programming (i.e., writing) of a bit-cell. eDRAM (embedded Dynamic Access Memory) on the other hand suffers from low retention time due to leakage in its select transistor.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIG. 3 illustrates a top view of a layout of the four terminal hybrid integrated MRAM and eDRAM bit-cell of FIG. 2, according to one embodiment of the disclosure.

FIG. 4A illustrates a first cross-section view of the layout of FIG. 3, according to one embodiment of the disclosure.

FIG. 4B illustrates a second cross-section view of the layout of FIG. 3, according to one embodiment of the disclosure.

FIG. 4C illustrates a third cross-section view of the layout of FIG. 3, according to one embodiment of the disclosure.

DETAILED DESCRIPTION

Figure 1B:
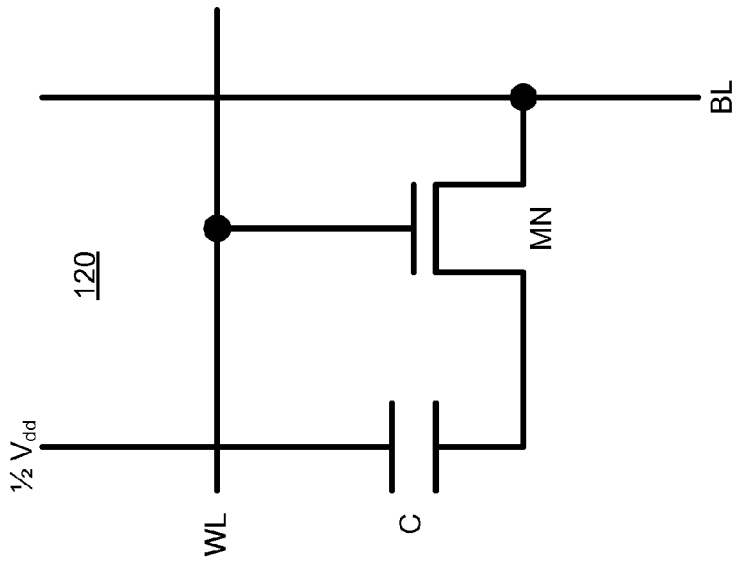
FIG. 1B illustrates a three terminal 1T-1C eDRAM bit-cell.
Figure 1A:
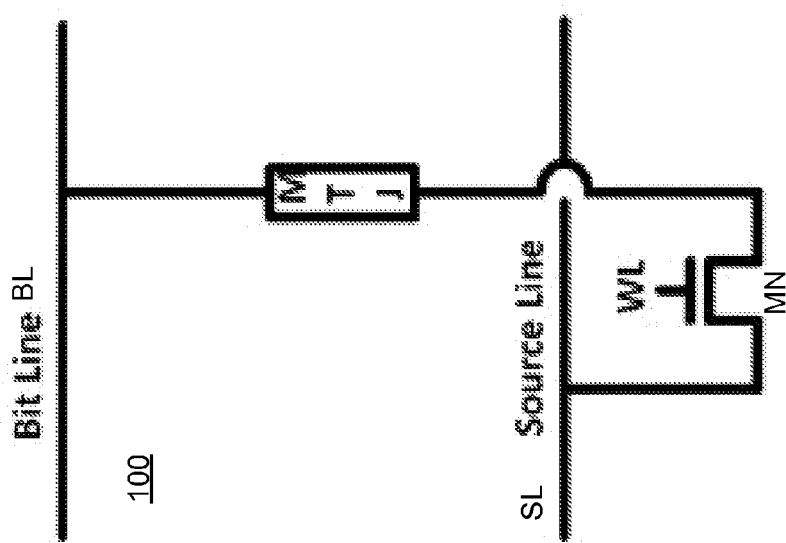
FIG. 1A illustrates a two terminal 1T-1MTJ bit-cell for STT-MRAM.

FIG. 1A illustrates a two terminal 1T-1MTJ (i.e., one transistor and one Magnetic Tunnel Junction) bit-cell 100 for STT-MRAM. Here, MTJ device is coupled in series to an n-type select transistor MN. The gate terminal of the n-type select transistor MN is coupled to Word Line (WL). The source/drain terminal of the n-type transistor MN is coupled to Source Line (SL) and the drain/source terminal of the n-type transistor MN is coupled to one end of the MTJ. Another end of the MTJ is coupled to Bit Line (BL).

The read and write current paths for bit-cell 100 are identical, resulting in many design trade-offs. For example, during read operation, higher resistance of MTJ device is desired than during write operation. However, same current paths for passing read and write currents discourages from having different resistances for read and write operations. To write a logical high to bit-cell 100, BL is raised relative to SL (or Select Line), and to write a logical low to bit-cell 100, BL is lowered relative to the SL. To read from bit-cell 100, SL is set to logical low and MTJ resistance is sensed using weak current (e.g., $\frac{1}{8}^{th}$ of write current).

The 1T-1MTJ bit-cell 100 may have large write current (e.g., greater than 100 µA) and large voltage (e.g., greater than 0.7V) requirements of tunnel junction. The 1T-1MTJ bit-cell 100 may have high write error rates or low speed switching (e.g., exceeding 20 ns) in MTJ based MRAM. The 1T-1MTJ bit-cell 100 may also have reliability issues due to tunneling current in magnetic tunnel junctions. For example, insulator layer in the MTJ device is a barrier (e.g., 1 KΩ to 10 KΩ) which resists flow of large current, and lower current flow causes higher write errors.

FIG. 1B illustrates a three terminal 1T-1C (one transistor and one capacitor) eDRAM (embedded Dynamic Random Access Memory) bit-cell 120. Bit-cell 120 includes an n-type transistor MN with its gate terminal coupled to WL, source/drain terminal coupled to BL and drain/source terminal coupled to a first terminal of a capacitor C. The second terminal of the capacitor is coupled to a voltage terminal (e.g., $\frac{1}{2} V_{dd}$). The retention time of eDRAM bit-cell suffers from leakage through n-type transistor MN. The retention time of eDRAM bit-cell is low (e.g., less than 75 µs) even when combined with low leakage n-type transistor MN.

The embodiments describe a hybrid eDRAM and MRAM memory bit-cell and array which simultaneously provides fast write and read performances of an eDRAM bit-cell under normal operating conditions, and long retention time of data during low activity conditions (e.g., Sleep mode, or low power mode). The embodiments also use a Metal-Insulator-Metal (MIM) based capacitor to implement the capacitance for the eDRAM. The integrated layout of the embodiment of hybrid eDRAM and MRAM memory bit-cell packs the two bit-cells together in a way to make manufacturing of large bit arrays feasible. The embodiments also use at most four control lines per bit-cell which further allows for higher density packaging of the hybrid bit-cells in an array.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical connection between the things that are connected, without any intermediary devices. The term "coupled" means either a direct electrical connection between the things that are connected or an indirect connection through one or more passive or active intermediary devices. The term "circuit" means one or more passive and/or active components that are arranged to cooperate with one another to provide a desired function. The term "signal" means at least one current signal, voltage signal or data/clock signal. The meaning of "a," "an," and "the" include plural references. The meaning of "in" includes in and "on."

The term "scaling" generally refers to converting a design (schematic and layout) from one process technology to another process technology. The term "scaling" generally also refers to downsizing layout and devices within the same technology node. The term "scaling" may also refer to adjusting (e.g., slow down) of a signal frequency relative to another parameter, for example, power supply level. The terms "substantially," "close," "approximately," "near," and "about," generally refer to being within +/−20% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For purposes of the embodiments, the transistors are metal oxide semiconductor (MOS) transistors, which include drain, source, gate, and bulk terminals. The transistors also include Tri-Gate and FinFET transistors, Gate All Around Cylindrical Transistors or other devices implementing transistor functionality like carbon nano tubes or spintronic devices. Source and drain terminals may be identical terminals and are interchangeably used herein. Those skilled in the art will appreciate that other transistors, for example, Bi-polar junction transistors—BJT PNP/NPN, BiCMOS, CMOS, eFET, etc., may be used without departing from the scope of the disclosure. The term "MN" indicates an n-type transistor (e.g., NMOS, NPN BJT, etc.) and the term "MP" indicates a p-type transistor (e.g., PMOS, PNP BJT, etc.).

Figure 2:
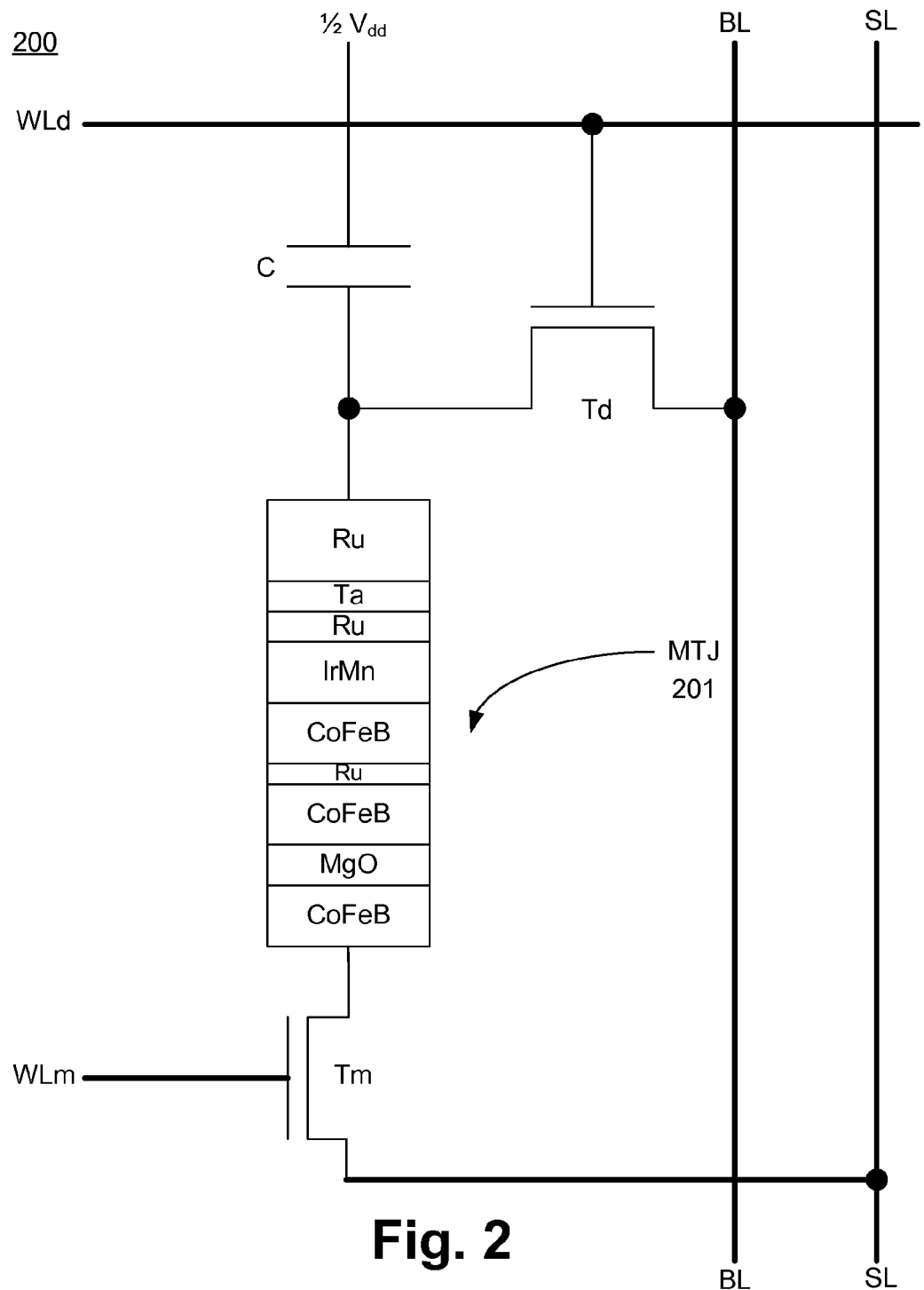
FIG. 2 illustrates a four terminal hybrid integrated MRAM (Magnetic Random Access Memory) and eDRAM bit-cell, according to one embodiment of the disclosure.

FIG. 2 illustrates a four terminal hybrid integrated MRAM and eDRAM bit-cell 200, according to one embodiment of the disclosure. It is pointed out that those elements of FIG. 2 having the same reference numbers (or names) as the elements of any other figure can operate or function in any manner similar to that described, but are not limited to such.

In one embodiment, bit-cell 200 comprises a first transistor Td, second transistor Tm, resistive memory element 201, and capacitor C. In one embodiment, bit-cell 200 is controlled by four control lines—first WL, second WL, SL, and BL. While the embodiments are described with reference to n-type transistors for first transistor Td and second transistor Tm, the same concepts apply for p-type transistors for first transistor Td and second transistor Tm. The four control lines are also referred as cache lines. In one embodiment, the cache lines can be either in eDRAM or MRAM modes.

In one embodiment, source/drain terminal of first transistor Td is coupled to BL, and drain/source terminal of first transistor Td is coupled to a first terminal of capacitor C. In one embodiment, gate terminal of the first transistor Td is coupled to the first WL (also referred here as WLd). In one embodiment, a second terminal of capacitor C is coupled to a bias voltage. In one embodiment, the bias voltage is ½ Vdd, where Vdd is the supply voltage. In other embodiments, the bias voltage may be set to another voltage level.

In one embodiment, capacitor C is implemented as a MIM capacitor. In one embodiment, the MIM capacitor is a trench capacitor. In another embodiment, the MIM capacitor is a growth capacitor. In one embodiment, the MIM capacitor is located in metal layers identical to the location of the MTJ device i.e., the MIM capacitor is located in the same vertical layers as the MTJ device. In one embodiment, the MIM capacitor is formed above the bit-cell in higher metal layers.

In one embodiment, second transistor Tm has a source/drain terminal coupled to SL, drain/source terminal coupled to first terminal of the resistive memory element 201. In one embodiment, gate terminal of second transistor Tm is coupled to the second WL (also referred here as WLm). In one embodiment, second terminal of resistive memory element 201 is coupled to the first terminal of capacitor C and drain/source terminal of first transistor Td.

In one embodiment, resistive memory element 201 is one of: Magnetic Tunnel Junction (MTJ) device; Phase Change Memory (PCM) device; Resistive RAM device; or Conductive Bridging RAM. The following embodiments are described with reference to resistive memory element 201 being an MTJ device. However, other devices may be used instead of the MTJ device. Depending on direction of current flow through the MTJ device, MTJ resistance changes which determines whether a logical one or logical zero is being stored in the MTJ device. For example, when current flowing through the MTJ device causes its free and fixed magnets to have the same magnetic alignment, then resistance of the MTJ device reduces. In another example, when current flowing through the MTJ device causes its free and fixed magnets to have an opposite magnetic alignment relative to one another, then resistance of the MTJ device increases.

A wide combination of materials can be used for material stacking of the MTJ device. In one embodiment, the stack of materials include: $Co_xFe_yB_z$, MgO, $Co_xFe_yB_z$, Ru, $Co_xFe_yB_z$, IrMn, Ru, Ta, and Ru, where 'x,' 'y,' and 'z' are integers. In other embodiments, other materials may be used to form the MTJ device which includes a fixed magnetic layer and the free magnetic layer. In one embodiment, the MTJ device stack comprises of free magnetic layer (FM1), MgO tunneling oxide, a fixed magnetic layer (FM2) with Synthetic Anti-Ferro-magnet (SAF)—CoFe/Ru based Anti-Ferromagnet (AFM). The SAF layer allows for cancelling the dipole fields around the free magnetic layer. A wide combination of materials can be used for material stacking.

In one embodiment, bit-cell 200 is operable to function as an eDRAM bit-cell in one mode and MRAM hybrid bit-cell in another mode. In one embodiment, when a memory unit having bit-cell 200 is in active mode then bit-cell 200 functions in eDRAM mode by turning off second transistor Tm i.e., WLm is logically low. In such an embodiment, MTJ device 201 hangs off of the first node of capacitor C, and bit-cell behaves like a standard eDRAM. In one embodiment, in eDRAM mode for write operation, first transistor Td (also referred as select transistor) is turned ON by WLd. In such an embodiment, current flows from supply ½ $V_{dd}$ to BL to charge capacitor C via first transistor Td. In one embodiment, in eDRAM mode for read operation, BL voltage is monitored when first transistor is turned ON to determine the charge stored on capacitor C.

In one embodiment, when a memory unit having bit-cell 200 is in low power mode (e.g., sleep mode or OFF mode) then bit-cell 200 functions in hybrid mode (also referred as the MRAM mode), where eDRAM and MRAM are both enabled. In this embodiment, MRAM plays to role of long term retention memory element. In one embodiment, both first and second transistors (Td and Tm) are enabled by their respective WLs i.e., WLd and WLm respectively. In one embodiment, BL and SL are raised to either '1' or '0' (or '0' or '1') as required by the state to which the memory is being written. Here, '1' refers to logical high (e.g., Vcc or Vdd) and '0' refers to logical low (e.g., ground). In one embodiment, current from the first and second transistors (Td and Tm) allow for a spin torque mediated switching of MTJ device 201 into the appropriate condition. In one embodiment, to read from MTJ device 201, resistance of MTJ device is detected through SL and BL using a sense amplifier (not shown).

The embodiment of FIG. 2 provides high retention and low leakage state in combination with fast accessibility for high performance condition. In one embodiment fast access time for high performance mode of operation is provided using the eDRAM mode, and long retention time is provided for low activity factor applications.

FIG. 3 illustrates a top view 300 of a layout of the four terminal hybrid integrated MRAM and eDRAM bit-cell of FIG. 2, according to one embodiment of the disclosure. It is pointed out that those elements of FIG. 3 having the same reference numbers (or names) as the elements of any other figure can operate or function in any manner similar to that described, but are not limited to such.

In this embodiment, SL is formed with metal zero (M0), BL is formed with M0, and the MTJ device 201 is formed in a region dedicated for third metal layer (M3). In this embodiment, M0 is the layer closest to the transistor (i.e., closest to diffusion area), M2 is above M1, M3 is above M2, and M4 is above M3. In one embodiment, MTJ device 201 is implemented in via V1-M1-V2-M2-V3 stack. In one embodiment, capacitor C is a MIM capacitor and is implemented in the same vertical location i.e., V1-M1-V2-M2-V3 stack. In one embodiment, MIM capacitor and MTJ device are connected at the top layer through M3 in a direction parallel to the direction of the gate region of second transistor Tm. In this embodiment, gate terminal of first transistor Td is coupled to WLd which is drawn in M1, where M1 extends perpendicular to M0. In one embodiment, gate terminal of second transistor Tm is coupled to WLm which is also drawn in M1.

In one embodiment, SL and BL are formed with M2, WLm and WLd are formed in M3, and MTJ device 201 is positioned in the region V2-M2-V3. In one embodiment, capacitor C is a MIM capacitor and is implemented in the same vertical location i.e., V2-M2-V3 stack. In one embodiment, MIM capacitor C and MTJ device 201 are connected at the top layer through M3 in a direction parallel to the direction of the gate region of second transistor Tm. Other similar layouts are possible using the basic layout of FIG. 3. Cross-sections AA', BB', and CC' of layout 300 are described with reference to FIGS. 4A-C respectively.

FIG. 4A illustrates a first cross-section view 400 of section AA' of the layout of FIG. 3, according to one embodiment of the disclosure. It is pointed out that those elements of FIG. 4A having the same reference numbers (or names) as the elements of any other figure can operate or function in any manner similar to that described, but are not limited to such.

In one embodiment, the source and drain regions of second transistor Tm are coupled to metal layers TCN (i.e., trench contact). In one embodiment, SL in M0 couples to source region of second transistor Tm via TCN. In one embodiment, drain region of second transistor Tm is coupled to first terminal of MTJ through a vertical stack of V1-M1. In one embodiment, second terminal of MTJ device 201 is accessible by M3 through V2-M2-V3, where V2 is coupled to the second terminal of MTJ device 201.

FIG. 4B illustrates a second cross-section view 420 of section BB' of the layout of FIG. 3, according to one embodiment of the disclosure. It is pointed out that those elements of FIG. 4B having the same reference numbers (or names) as the elements of any other figure can operate or function in any manner similar to that described, but are not limited to such.

In one embodiment, the source and drain regions of first transistor Td are coupled to metal layers TCN. In one embodiment, BL in M0 couples to source region of first transistor Td through TCN. In one embodiment, drain region of first transistor Td is coupled to first terminal of MIM capacitor C. In this embodiment, MIM capacitor C is formed as a trench capacitor. The bold black region is the bottom capacitor plate (i.e., first terminal of capacitor). In one embodiment, second terminal of MIM capacitor C is coupled to M3 through via V3. The region between the two plates of the MIM capacitor is filled with a high K di-electric material (e.g., $HfO_2$) to enable large capacitance for charge storage.

FIG. 4C illustrates a third cross-section view 430 of section CC' of the layout of FIG. 3, according to one embodiment of the disclosure. It is pointed out that those elements of FIG. 4C having the same reference numbers (or names) as the elements of any other figure can operate or function in any manner similar to that described, but are not limited to such.

This cross-section shows coupling of MIM capacitor C and second terminal of MTJ device 201. The TCN to the left is coupled to the drain/source terminal of the second transistor Tm, while the TCN to the right is coupled to drain/source terminal of the first transistor Td. The first terminal of MIM capacitor C is coupled to the TCN to the right while the second terminal of MIM capacitor C is coupled to M3. Here, the stack of vias and MTJ device 201 coupled at one end to the drain/source terminal of the second transistor Tm and at the other end to M3. Both MIM capacitor C and M3 are coupled together. While the embodiment shows a trench based MIM capacitor C, a growth MIM capacitor C can also be used instead of the trench based MIM.

Figure 5:
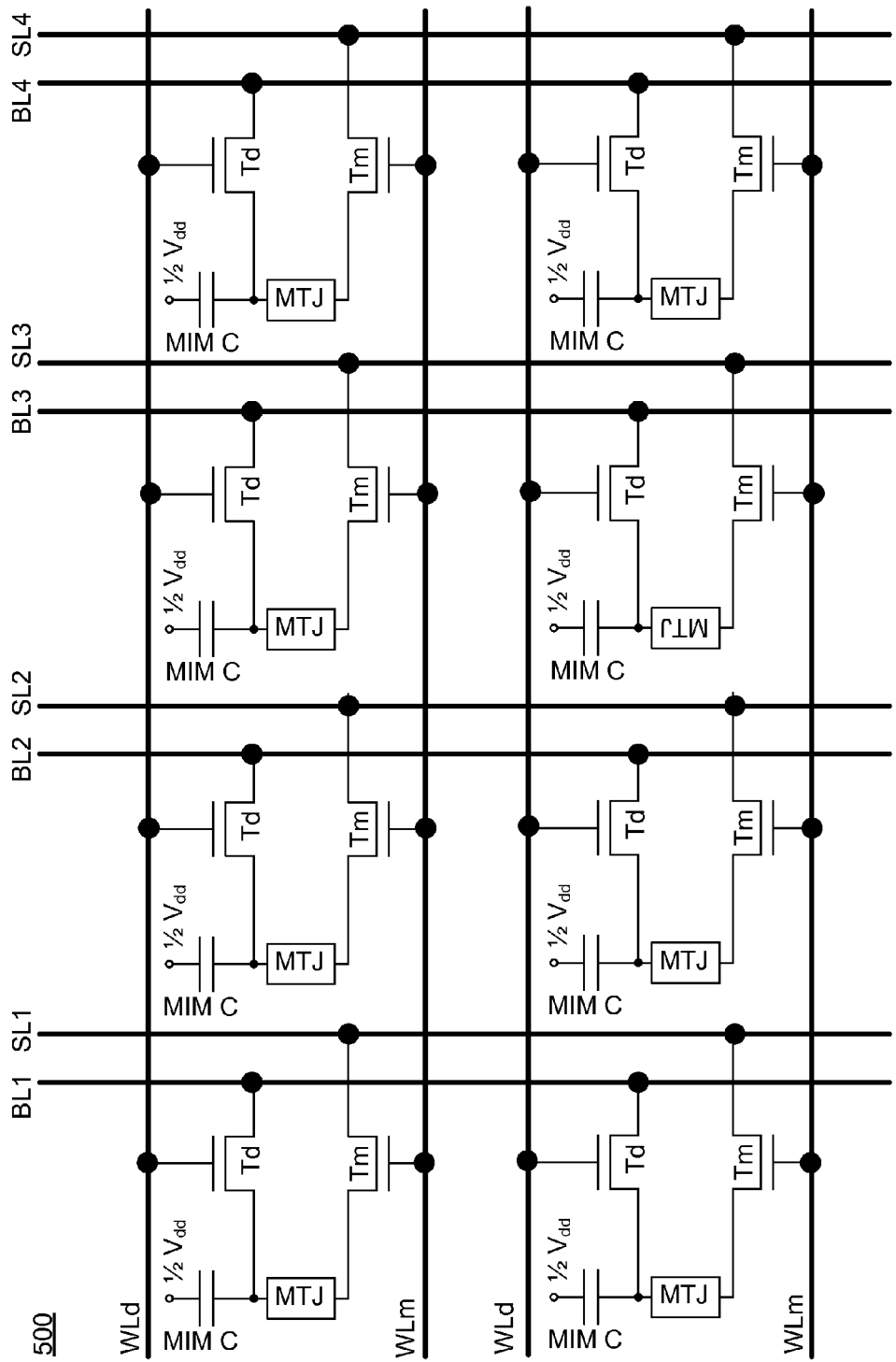
FIG. 5 illustrates an array of the hybrid integrated MRAM and eDRAM bit-cells, according to one embodiment of the disclosure.

FIG. 5 illustrates an array 500 of the hybrid integrated MRAM and eDRAM bit-cells, according to one embodiment of the disclosure. It is pointed out that those elements of FIG. 5 having the same reference numbers (or names) as the elements of any other figure can operate or function in any manner similar to that described, but are not limited to such. So as not to obscure the embodiments, a 2×4 array of hybrid integrated MRAM and eDRAM bit-cells is shown with three horizontal rows and four vertical columns However, the embodiments are applicable to any array size.

In this embodiment, array 500 comprises a plurality of hybrid integrated MRAM and eDRAM bit-cells; a plurality source lines SL1-SL4, a plurality of bit lines—BL1-BL4; a plurality of first word lines WLd1-WLd2; and a plurality of second word lines WLm1-WLm2. In one embodiment, for eDRAM mode, column selectivity is obtained via the first transistor Td. In one embodiment, for eDRAM mode, row selectively is obtained via BL/SL. In one embodiment, for MRAM mode, column selectivity is obtained via first transistor Td and second transistor Tm. In one embodiment, for MRAM mode, row selectivity is obtained by BL/SL.

The embodiments of plurality of hybrid integrated MRAM and eDRAM bit-cells are arranged in array 500 such that in both eDRAM and MRAM modes there are no current paths in surrounding cells (i.e., bit-cells surrounding the selected bit-cell). The lack of current paths result in no proximity read disturbs or loop currents. The bit-cells may be implemented according to any of the embodiments of this disclosure.

Figure 6:
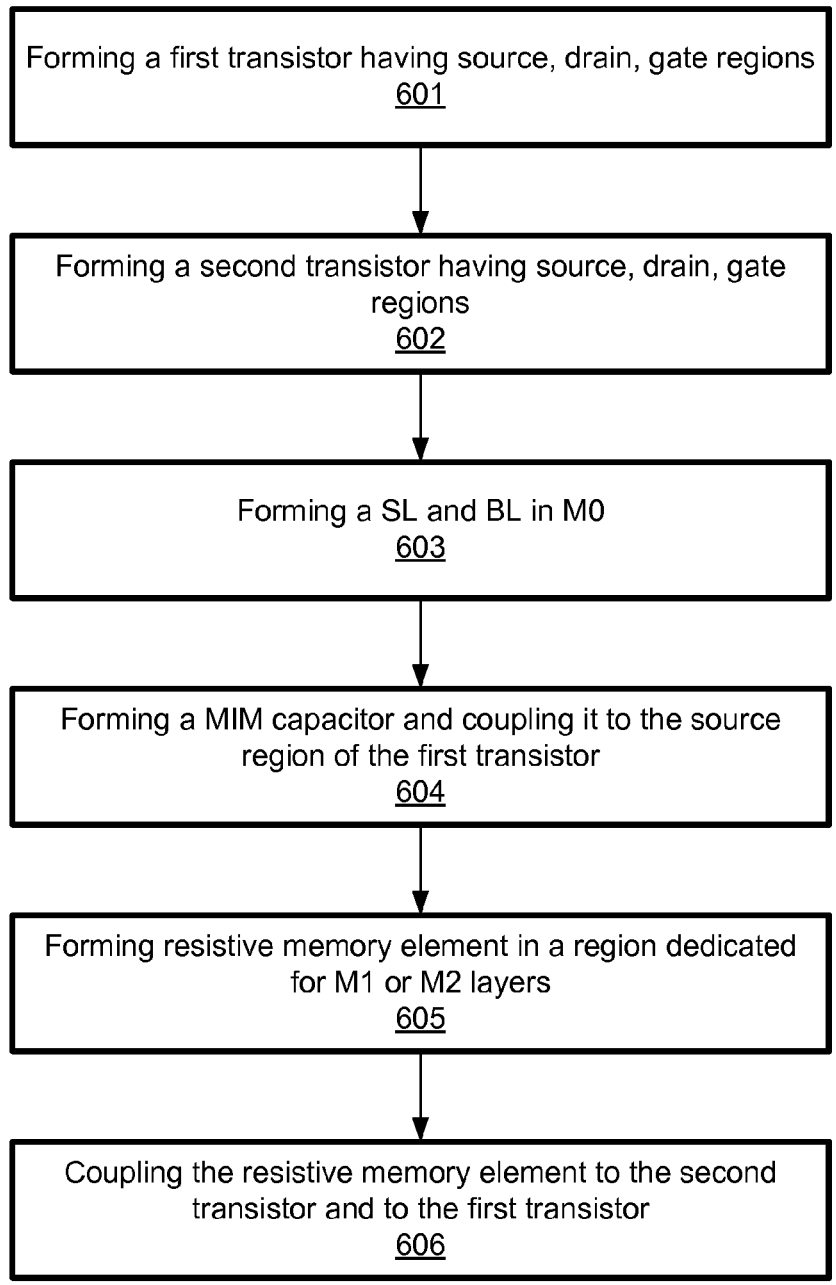
FIG. 6 illustrates a flowchart of a method for forming the hybrid integrated MRAM and eDRAM bit-cell, according to one embodiment of the disclosure.

FIG. 6 illustrates a flowchart 600 of a method for forming the hybrid integrated MRAM and eDRAM bit-cell, according to one embodiment of the disclosure. Although the blocks in the flowcharts with reference to FIG. 6 are shown in a particular order, the order of the actions can be modified. Thus, the illustrated embodiments can be performed in a different order, and some actions/blocks may be performed in parallel. Some of the blocks and/or operations listed in FIG. 6 are optional in accordance with certain embodiments. The numbering of the blocks presented is for the sake of clarity and is not intended to prescribe an order of operations in which the various blocks must occur. Additionally, operations from the various flows may be utilized in a variety of combinations. It is pointed out that those elements of FIG. 6 having the same reference numbers (or names) as the elements of any other figure can operate or function in any manner similar to that described, but are not limited to such.

At block 601, the first transistor Td is formed having a source region, drain region, and gate region. The source and drain regions are coupled to TCN. At block 602, the second transistor Tm is formed having a source region, drain region, and gate region. The source and drain regions are coupled to TCN. At block 603, SL and BL are formed on M0. At block 604, a MIM capacitor is formed in vertical location i.e., V1-M1-V2-M2-V3 stack, and is coupled to the source region of the first transistor through the TCN. At block 605, a resistive memory element (e.g., MTJ device) is formed in same region as the MIM capacitor i.e., V1-M1-V2-M2-V3 stack. In one embodiment, resistive memory element is formed in the region dedicated for M1 or M2. At block 606, the resistive memory element is coupled to the second transistor Tm and to the first transistor Td.

Figure 7:
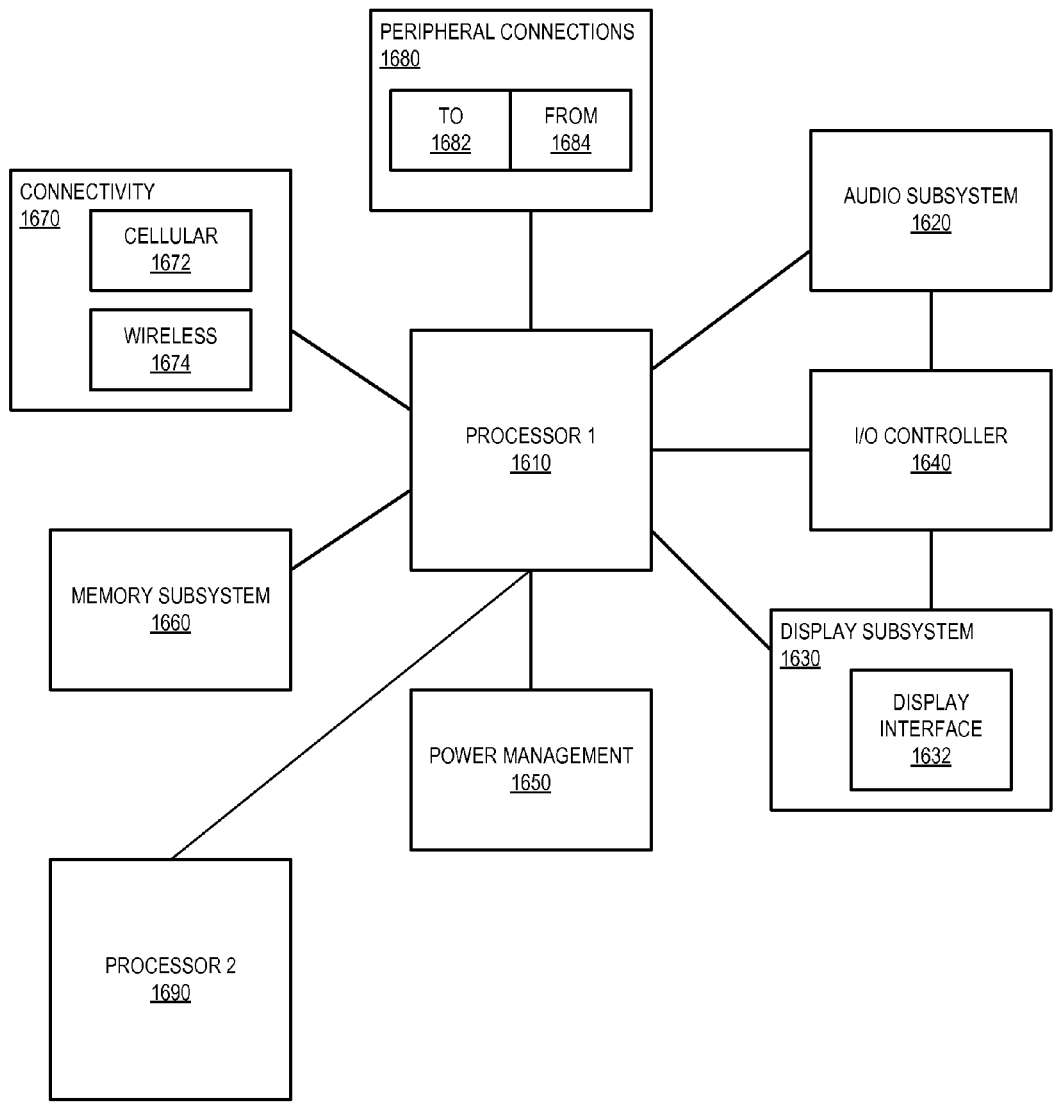
FIG. 7 is a smart device or a computer system or an SoC (System-on-Chip) with the hybrid integrated MRAM and eDRAM bit-cell, according to one embodiment of the disclosure.

FIG. 7 illustrates a smart device or a computer system or an SoC (system-on-chip) 1600 with the hybrid integrated MRAM and eDRAM bit-cell, according to one embodiment of the disclosure. It is pointed out that those elements of FIG. 7 having the same reference numbers (or names) as the elements of any other figure can operate or function in any manner similar to that described, but are not limited to such.

FIG. 7 illustrates a block diagram of an embodiment of a mobile device in which flat surface interface connectors could be used. In one embodiment, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in computing device 1600.

In one embodiment, computing device 1600 includes a first processor 1610 with the hybrid integrated MRAM and eDRAM bit-cell, according to the embodiments discussed. Other blocks of the computing device 1600 may also include the hybrid integrated MRAM and eDRAM bit-cell of the embodiments. The various embodiments of the present disclosure may also comprise a network interface within 1670 such as a wireless interface so that a system embodiment may be incorporated into a wireless device, for example, cell phone or personal digital assistant.

In one embodiment, processor 1610 (and processor 1690) can include one or more physical devices, such as microprocessors, application processors, microcontrollers, programmable logic devices, or other processing means. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In one embodiment, computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 1600, or connected to the computing device 1600. In one embodiment, a user interacts with the computing device 1600 by providing audio commands that are received and processed by processor 1610.

Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

In one embodiment, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In one embodiment, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 1680 include hardware interfaces and connectors, as well as software components (e.g., drivers, protocol stacks) to make peripheral connections. It will be understood that the computing device 1600 could both be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), Display-Port including MiniDisplayPort (MDP), High Definition Multimedia Interface (HDMI), Firewire, or other types.

Reference in the specification to "embodiment," "one embodiment," "some embodiments," or "other embodiments" means that a particular feature, structure, or characteristic described in connection with the embodiments is included in at least some embodiments, but not necessarily all embodiments. The various appearances of "embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, an apparatus is provided which comprises: a capacitor having a first terminal and a second terminal; a first transistor having a gate terminal coupled to a first word line (WL), a source/drain terminal coupled to bit line (BL), and drain/source terminal coupled to the first terminal of the capacitor; a resistive memory element having a first terminal and a second terminal, the first terminal of the resistive memory element device coupled to the first terminal of the capacitor; and a second transistor having a gate terminal coupled to a second WL, a source/drain terminal coupled to source line (SL), and drain/source terminal coupled to the second terminal of the resistive memory element device.

In one embodiment, the apparatus further comprises control logic for operating the apparatus in DRAM mode or MRAM mode. In one embodiment, the first transistor when turned ON in DRAM mode, charges the capacitor. In one embodiment, the second transistor is turned OFF in DRAM mode. In one embodiment, the first and second transistors are turned ON in MRAM mode. In one embodiment, the BL and SL are raised and lowered respectively or visa versa to write a state in the resistive memory element. In one embodiment, the capacitor is a MIM capacitor. In one embodiment, the resistive memory element is one of: Magnetic Tunnel Junction (MTJ) device; Phase Change Memory (PCM) device; Resistive RAM device; or Conductive Bridging RAM.

In another example, an apparatus is provided which comprises: a DRAM bit-cell; and an MRAM bit-cell integrated with the DRAM bit-cell, wherein a combination of DRAM bit-cell and MRAM bit-cell have no more than four control lines. In one embodiment, the DRAM bit-cell includes a MIM capacitor. In one embodiment, the DRAM bit-cell comprises: a capacitor having a first terminal and a second terminal; and a first transistor having a gate terminal coupled to a first word line (WL), a source/drain terminal coupled to bit line (BL), and drain/source terminal coupled to the first terminal of the capacitor.

In one embodiment, the MRAM bit-cell comprises: a resistive memory element having a first terminal and a second terminal, the first terminal of the resistive memory element device coupled to the first terminal of the capacitor; and a second transistor having a gate terminal coupled to a second WL, a source/drain terminal coupled to source line (SL), and drain/source terminal coupled to the second terminal of the resistive memory element device. In one embodiment, the four control lines are the first WL, the second WL, SL, and BL. In one embodiment, the resistive memory element is one of: Magnetic Tunnel Junction (MTJ) device; Phase Change Memory (PCM) device; Resistive RAM device; or Conductive Bridging RAM.

In one embodiment, a system is provided which comprises: a processor; a memory coupled to the processor, the memory having an apparatus according to the apparatus discussed above; and a wireless interface for allowing the processor to communicate with another device. In one embodiment, the system further comprises: a display unit.

In another example, a method is provided which comprises: forming a first transistor having source region, drain region, and gate region; forming a MIM capacitor and coupling it to the source region of the first transistor; forming a second transistor having source region, drain region, and gate region; forming source line (SL) and bit line (BL) in metal zero (M0); forming a resistive memory element in a region dedicated for metal one (M1) or metal two (M2); and coupling the resistive memory element to the second transistor and to the first transistor.

In one embodiment, the resistive memory element is one of: Magnetic Tunnel Junction (MTJ) device; Phase Change Memory (PCM) device; Resistive RAM device; or Conductive Bridging RAM.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
    a capacitor having a first terminal and a second terminal;
    a first transistor having a gate terminal coupled to a first word line (WL), a source/drain terminal coupled to a bit line (BL), and a drain/source terminal coupled to the first terminal of the capacitor;
    a resistive memory element having a first terminal and a second terminal, the first terminal of the resistive memory element device coupled to the first terminal of the capacitor; and
    a second transistor having a gate terminal coupled to a second WL, a source/drain terminal coupled to a source line (SL), and a drain/source terminal coupled to the second terminal of the resistive memory element device, wherein the BL and SL are raised and lowered respectively or vice versa to write a state in the resistive memory element.

2. The apparatus of claim 1 further comprises control logic for operating the apparatus in DRAM mode or MRAM mode.

3. The apparatus of claim 2, wherein the first transistor when turned ON in DRAM mode, charges the capacitor.

4. The apparatus of claim 3, wherein the second transistor is turned OFF in DRAM mode.

5. The apparatus of claim 2, wherein the first and second transistors are turned ON in MRAM mode.

6. The apparatus of claim 1, wherein the capacitor is a MIM capacitor.

7. The apparatus of claim 1, wherein the resistive memory element is one of:
    Magnetic Tunnel Junction (MTJ) device;
    Phase Change Memory (PCM) device;
    Resistive RAM device; or
    Conductive Bridging RAM.

8. An apparatus comprising:
    a DRAM bit-cell comprising a first transistor having a gate terminal coupled to a first word line (WL) and a source/drain terminal coupled to a bit line (BL); and
    an MRAM bit-cell integrated with the DRAM bit-cell, wherein the MRAM bit- cell comprises a second transistor having a gate terminal coupled to a second WL and a source/drain terminal coupled to a source line (SL), and the MRAM bit-cell comprising a resistive memory element, wherein the BL and SL are raised and lowered respectively or vice versa to write a state in the resistive memory element, and wherein a combination of DRAM bit-cell and MRAM bit-cell have no more than four control lines.

9. The apparatus of claim 8, wherein the DRAM bit-cell includes a MIM capacitor.

10. The apparatus of claim 8, wherein the DRAM bit-cell comprises:
    a capacitor having a first terminal and a second terminal; and
    the first transistor having a drain/source terminal coupled to a capacitor.

11. The apparatus of claim 10, wherein the MRAM bit-cell comprises:
    the resistive memory element having a first terminal and a second terminal, the first terminal of the resistive memory element device coupled to the first terminal of the capacitor.

12. The apparatus of claim 11, wherein the four control lines are the first WL, the second WL, SL, and BL.

13. The apparatus of claim 11, wherein the resistive memory element is one of:

Magnetic Tunnel Junction (MTJ) device;
Phase Change Memory (PCM) device;
Resistive RAM device; or
Conductive Bridging RAM.

14. A system comprising:
a processor;
   a memory coupled to the processor, the memory having an apparatus which comprises:
a capacitor having a first terminal and a second terminal;
   a first transistor having a gate terminal coupled to a first word line (WL), a source/drain terminal coupled to bit line (BL), and a drain/source terminal coupled to the first terminal of the capacitor;
   a resistive memory element having a first terminal and a second terminal, the first terminal of the resistive memory element device coupled to the first terminal of the capacitor; and
   a second transistor having a gate terminal coupled to a second WL, a source/drain terminal coupled to a source line (SL), and a drain/source terminal coupled to the second terminal of the resistive memory element device, wherein the BL and SL are raised and lowered respectively or vice versa to write a state in the resistive memory element; and
   a wireless interface for allowing the processor to communicate with another device.

15. The system of claim 14 further comprises a display unit.

16. The system of claim 14 further comprises control logic for operating the apparatus in DRAM mode or MRAM mode.

17. A system comprising:
a processor;
   a memory coupled to the processor, the memory having an apparatus which comprises:
      a DRAM bit-cell comprising a first transistor having a gate terminal coupled to a first word line (WL) and a source/drain terminal coupled to a bit line (BL); and
      an MRAM bit-cell integrated with the DRAM bit-cell, wherein the MRAM bit-cell comprises a second transistor having a gate terminal coupled to a second WL and a source/drain terminal coupled to a source line (SL), and the MRAM bit-cell comprising a resistive memory element, wherein the BL and SL are raised and lowered respectively or vice versa to write a state in the resistive memory element, and wherein a combination of DRAM bit-cell and MRAM bit-cell have no more than four control lines; and
   a wireless interface for allowing the processor to communicate with another device.

18. The system of claim 17 further comprises a display unit.

19. The system of claim 17, wherein the DRAM bit-cell includes a MIM capacitor.

* * * * *